United States Patent [19]
Retali et al.

[11] 3,836,103
[45] Sept. 17, 1974

[54] SUPPORT FOR TUBULAR ROTARY KILN

[75] Inventors: Roger Retali, Saint Cloud; Alain Chielens, Marcq En Baroeul; Bernard Boussekey, Lille, all of France

[73] Assignee: Fives Lille Cail, Paris, France

[22] Filed: May 17, 1973

[21] Appl. No.: 361,051

[30] Foreign Application Priority Data
Aug. 16, 1972  France .............................. 72.29260

[52] U.S. Cl. ................................ 248/130, 308/203
[51] Int. Cl. ........................... F27g 7/00, F16c 13/04
[58] Field of Search .......... 248/130, 357, 181, 182, 248/184; 308/203, 204; 432/32, 103; 259/81 R

[56]    References Cited
UNITED STATES PATENTS

| 1,658,530 | 2/1928 | Kirmer | 248/130 |
| 2,134,557 | 10/1938 | Hilbish et al | 248/130 |
| 2,269,700 | 1/1942 | Treshow | 248/130 |
| 2,399,189 | 4/1946 | Johnson | 308/203 |
| 3,020,108 | 2/1962 | Clark et al | 308/203 |
| 3,168,014 | 2/1965 | Aslan | 248/357 |
| 3,185,459 | 5/1965 | Caubet et al | 248/130 |
| 3,387,482 | 6/1968 | Wilcock et al | 248/181 |
| 3,466,936 | 9/1969 | Gaupin | 432/103 |
| 3,648,992 | 3/1972 | Durinck et al | 308/203 |

FOREIGN PATENTS OR APPLICATIONS
720,901  12/1954  Great Britain ....................... 432/32

Primary Examiner—Marion Parsons, Jr.
Attorney, Agent, or Firm—Kurt Kelman

[57]    ABSTRACT

Supports for a rotary kiln comprise a support base, a pair of rollers mounted on the respective ends of a beam, and a ball-and-socket swivel joint mounting the beam on the support base intermediate the beam ends, the joint having a center in the plane of symmetry of the rollers perpendicular to the axes of the rollers and equidistant from the roller axes, and a diameter smaller than the width of the rollers defining a band of peripheral contact with the kiln during rotation thereof.

16 Claims, 8 Drawing Figures

3,836,103

SUPPORT FOR TUBULAR ROTARY KILN

The present invention relates to improvements in supports for tubular rotary kilns. Such kilns consist of tubular bodies of large diameter provided with a plurality of axially spaced belts or hoops along their length. Each kiln hoop rests on a plurality of rollers permitting rotation of the kiln about its axis.

It has been proposed to reduce the flexing fatigue of the hoops and a reduction of their width by supporting each hoop on four rollers grouped in two pairs, each pair of rollers being mounted symmetrically in respect of the kiln axis. The rollers of each pair are carried by a beam pivotal about an axis parallel to the axes of the rollers so as to equalize the loads on the rollers.

While various balancing systems have been proposed, it is the primary object of this invention to provide a simple and relatively inexpensive mounting of the pivoting support beam on a support base, which permits free orientation of the beam so as to equalize the loads on the support rollers and to assure a uniform distribution of the contact pressure over the entire width of the contact surfaces.

This and other objects are accomplished in accordance with the invention with a support comprising a support base, a beam having two ends mounted on the support base, and a pair of rollers, a respective one of the rollers being mounted on a respective one of the beam ends. The tubular rotary kiln is supported for rotation on the pair of rollers and the rollers have a width defining a band of peripheral contact with the kiln during the rotation thereof. A ball-and-socket swivel joint mounts the beam on the support base intermediate the beam ends. The joint has a center in the plane of symmetry of the rollers perpendicular to the axes of the rollers and equidistant from the roller axes, and a diameter smaller than the width of the rollers.

In a preferred embodiment, the swivel joint comprises two concentric rings, one of the rings being fixed to the support base and the other ring being fixed to the beam. With this embodiment, commercially available standard joints may be utilized so that no special parts need be manufactured. Furthermore, using joints of relatively small diameter reduces frictional forces and thus improves the uniform distribution of loads on the rollers.

The above and other objects, advantages and features of the present invention will become more apparent from the following detailed description of certain now preferred embodiments thereof, taken in conjunction with the accompanying drawing wherein FIG. 1 is a side elevational view, partly in section, of one embodiment of a support for a rotary kiln according to this invention, a like support (not shown) being arranged symmetrically in respect to a vertical axial plane passing through the tubular kiln;

Figure 1:
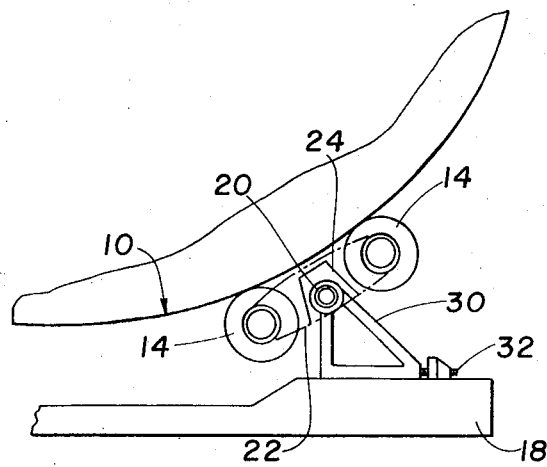
Figure 2:
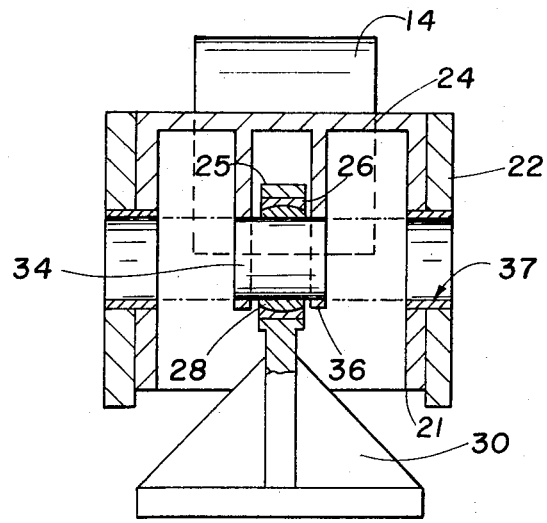
FIG. 2 is a transverse section of the support of FIG. 1, with the plane of section passing through the center of the swivel joint of the support parallel to the axes of the rollers.

Referring now to the drawing and first to FIGS. 1 and 2, the support of the present invention is shown rotatably to support a belt, hoop or runway 10 of a tubular rotary kiln, a like support, which is not illustrated, being arranged symmetrically in respect to a vertical axial plane passing through the tubular kiln to make rotary contact with the hoop 10. A plurality of such symmetrically arranged pairs of supports are arranged along the length of the kiln for its complete support but, since all the supports are alike, this invention is being described and illustrated in connection with a single one of the supports.

As shown, the support comprises a beam mounted on support base 19 by means of a ball-and-socket swivel joint 20 intermediate the beam ends, a respective one of a pair of rollers 14, 14 being mounted on a respective beam end. The rollers 14, 14 have a width which defines a band of peripheral contact with the kiln during the rotation thereof, i.e. they are in supporting contact with the kiln hoop 10. The center of swivel joint 20 is disposed in the plane of symmetry of the rollers and beam perpendicular to the axes of the rollers and equidistant from the roller axes so that the roller supporting beam is completely balanced. As can best be seen in FIG. 2, the diameter of the joint is smaller than the width of the rollers.

Referring more particularly to FIG. 2, the beam is shown to be constituted by two cheek plates 22, 22 and casing 24 which is open at the bottom and interconnects the two cheek plates. While shown separately in the drawing, the cheek plates could form an integral part of the beam casing, they could be of thin sheet metal or they may be castings. As can be seen in FIG. 1, the casing is of trapezoidal cross section in a plane perpendicular to the roller axes and its open bottom is arranged to receive intermediate support 30. The intermediate support is slidably mounted in suitable guides on the support base 18, set screws 32 being arranged to position the support 30 at a desired distance from the vertical axis plane of the kiln. The casing may be a single casting or it may be welded from suitable sheet metal plates. The cheek plates and the casing may be fixed together by screws, bolts or by welding.

The sides 21 of the casing and the cheek plates 22 have bores of like diameters and they may be assembled readily in perfect alignment for accurate parallelism of the roller axes by placing bushings 37 into the bores.

The ball-and-socket swivel joint 20 comprises an outer ring 26 and an interior ring 28 concentric with each other. The outer swivel joint ring is encased in cage 25 of intermediate support 30 which is adjustably mounted on support 18. The support 30 extends into, and is covered by, casing 24 so that the swivel joint is mounted within the casing.

The interior swivel joint ring 28 is mounted on axle 34 whose ends are fixed in a pair of flanges 36 extending into the interior of casing 24. The spacing between flanges 36 is equal to the width of ring 28 so that the same cannot be displaced along axle 34, thus holding ring 28 on the axle against movement parallel to the axle in respect of support 18. The width of outer ring 26 is smaller than that of interior ring 28 so that the beam may effectuate oscillations of a small amplitude about the center of the joint 20.

The inner bores of bushings 37 are so dimensioned as to permit axle 34 to be journaled therein.

Figure 3:
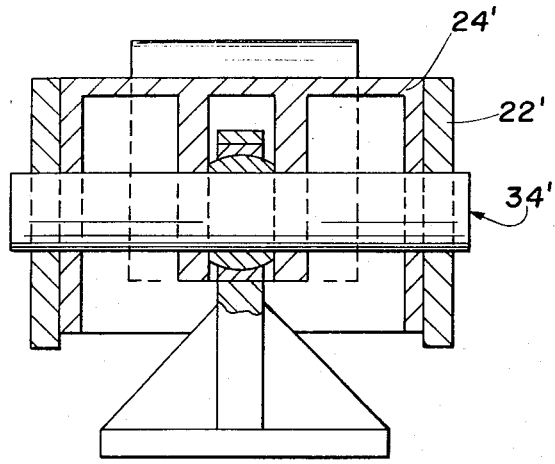
FIG. 3 is a view analogous to that of FIG. 2 but showing a modification.

In the modification of FIG. 3, the ends of axle 34' extend beyond the aligned bores in the sides of casing 24' and cheek plates 22' of the beam. In all other respects, this modification is identical to the embodiment of FIGS. 1 and 2, the difference being that, in the modification of FIG. 3, a part of the load is transmitted directly from the cheek plates to axle 34' while the entire load is transmitted to the axle from the casing in the embodiment of FIG. 2.

Figure 4:
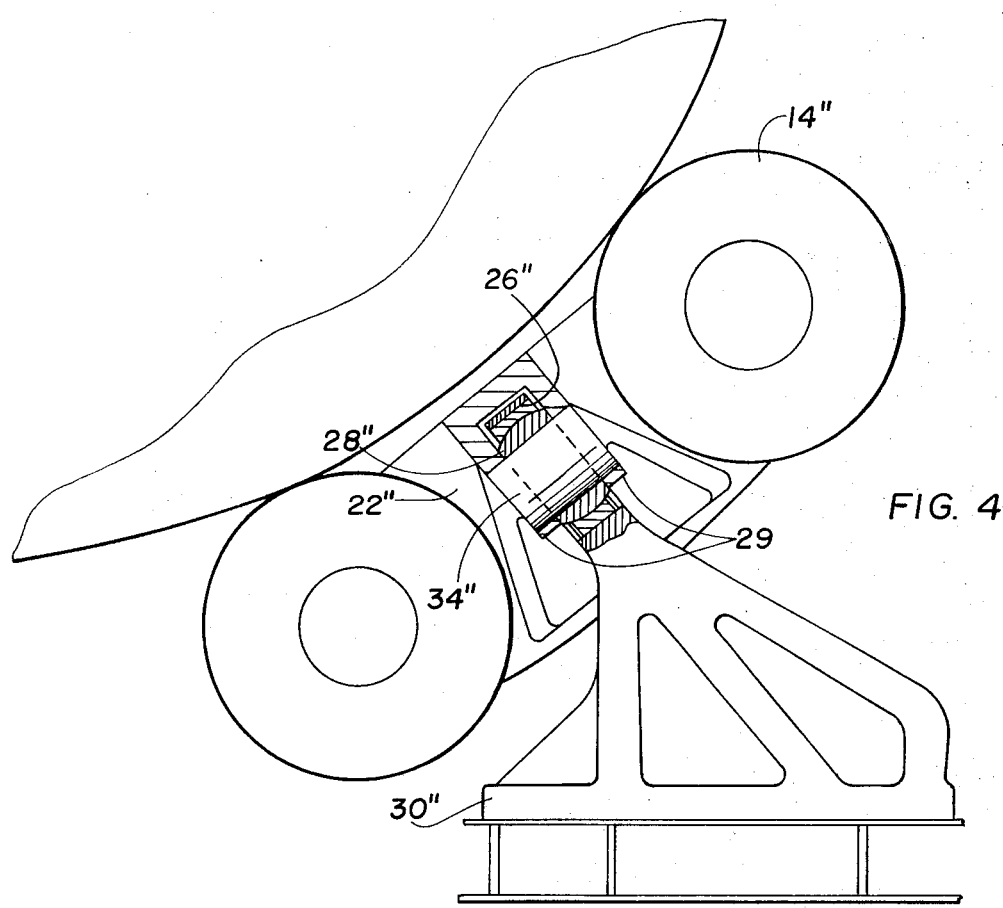
FIG. 4 is an enlarged partial view similar to that of FIG. 1 of a modified support.

As shown in the embodiment of FIG. 4, axle 34'' carrying the interior swivel joint ring 28'' may be disposed perpendicularly to the axles of the rollers 14''. Axle 34'' is carried by seats 29 integral with the beam, with the outer ring 26'' concentrically surrounding ring 28''.

If desired, stops may be provided to limit the oscillating movement of the beam about an axis passing through the center of the swivel joint and perpendicular to the plane defined by the generatrix of contact between the rollers and the kiln hoop.

Figure 5:
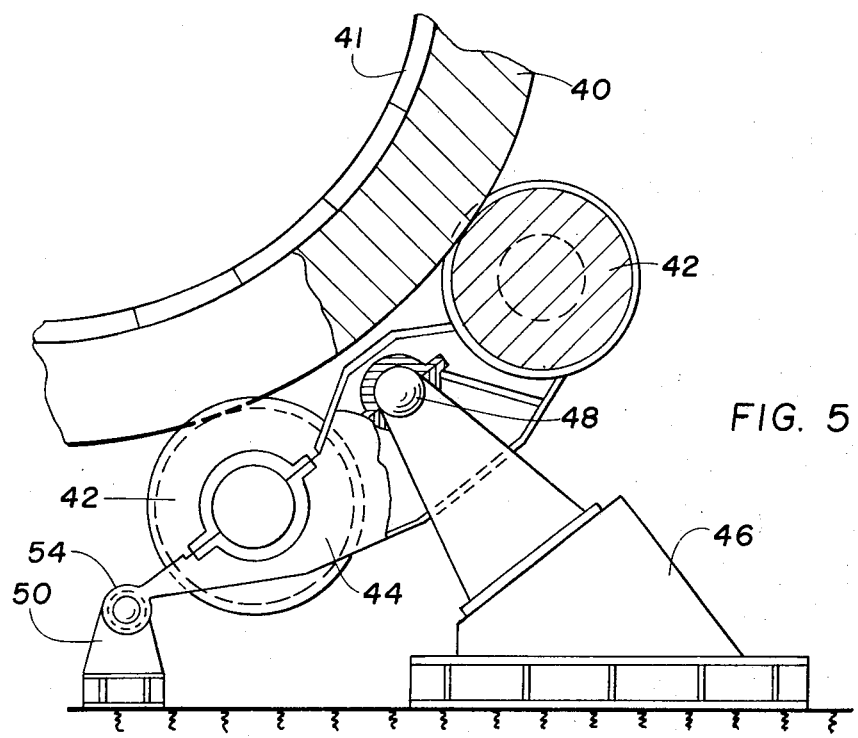
FIG. 5 is a side elevational view, partly in section, of another embodiment of a support according to the invention.
Figure 6:
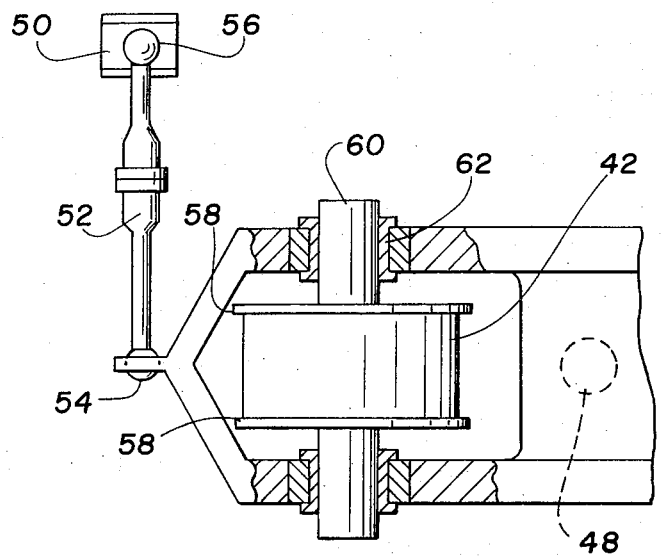
FIG. 6 is a top view of a portion of the support of FIG. 5.

In the embodiment of FIGS. 5 and 6, beam 44, on whose ends a pair of rollers 42 are carried, is balanced on ball-and-socket swivel joint 48 mounted on support 46. The center of joint 48 is disposed in the plane of symmetry of the beam perpendicular to the axes of rollers 42 and equidistantly therefrom, the joint being in, or substantially in, the plane defined by the roller axes.

One end of beam 44 is connected to a fixed anchorage 50 by means of a pull rod 52 of adjustable length. Ball-and-socket joint linkages 54 and 56 link respective ends of the rod to beam 44 and anchorage 50. The center of the linking joint 54 is disposed in the plane of symmetry of the beam in a straight line leading from the center of the principal joint 48 parallel to the plane defined by the axes of rollers 42. In its normal operating position, the rod 52 is parallel to the roller axes.

This disposition permits the beam 44 to rotate about any axis passing through the center of joint 48 and disposed in a plane defined by the centers of the three joints 48, 54 and 56 while preventing any other movement of the beam. Thus, this arrangement provides the function of a cardan joint while being much simpler in forming a support for a pair of rollers.

Thus, the beam may take a position which distributes the load equally over the two rollers and distributes the load on each roller uniformly over the length of the generatrix of contact with hoop 40 of kiln 41.

To enable rollers 42 to follow minor movements of hoop 40, they are provided with flanges 58 engaging the hoop along both edges with slight play. The rollers are mounted on axles 60 which are axially movable in their bearings 62 so as to permit axial displacement of the rollers. The bearings are suitably lubricated so that the forces engendered by these axial movements are negligible.

The position of the principal joint 48, at the time of assembly, is so adjusted that, taking into account the thermal expansion of the kiln during operation, the plane of symmetry of the rollers perpendicular to their axes passes through the center of joints 48 and 54, i.e. coincides with the plane of symmetry of the beam when the rollers are in their median position and under normal operating conditions of the kiln. Adjustment of pull rod 52 permits the regulation of the parallelism of the axes of the rollers and the hoop.

The axial path of the rollers must be sufficient to permit shrinkage of the kiln when it is cooled.

To permit the axial displacement of the rollers when the kiln is inoperative and cool, lubricating oil may be injected into the roller axle bearings 62 under pressure.

Figure 7:
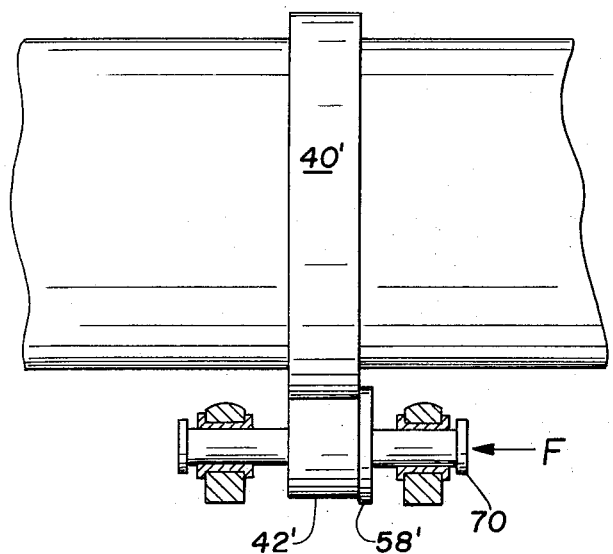
FIG. 7 is a side view of a modification of the support of FIG. 5, shown in its normal operating position.
Figure 8:
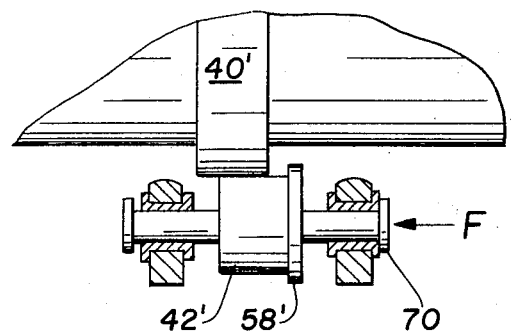
FIG. 8 shows the position taken by the support of FIG. 7 when the kiln is cold.

In the modification of FIGS. 7 and 8, the rollers 42' carry only a single flange 58' which engages one side edge of hoop 40', the flange being pressed against the hoop edge by any suitable means, such as a spring or a jack, or simply by the weight of the roller. The force F, which presses against the roller, must permit the same to recoil when it is pushed by the hoop. A stop 70 is mounted in the path of the axial displacement of the roller to limit the same. The flange 58' is mounted on the side of the roller towards which the kiln is displaced when it is thermally expanded.

During normal operation, the flange 58' is in contact engagement with the hoop 40' and the roller follows the axial movements of the hoop. When the kiln is cooled, the stop 70 limits the displacement of the roller and the hoop glides thereon. The advantage of this arrangement is that it limits gliding of the axes in their bearings to the extend necessary to compensate for the movement of the hoop and the variations of expansion of the kiln during operation, due to the wear of the brick lining of the kiln, i.e. to displacements of the order of a few inches, while the displacements due to the shrinkage of the kiln may surpass 6 inches.

The support of the present invention may be used in connection with a variety of tubular rotary kilns, such as kilns for making cement, calcining minerals, etc.

We claim:

1. A support for a tubular rotary kiln, comprising
   1. a support base,
   2. a beam having two ends mounted on the support base,
   3. a pair of rollers, a respective one of the rollers being mounted on a respective one of the beam ends,
      a. the tubular rotary kiln being supported for rotation on the pair of rollers and
      b. the rollers having a width defining a band of peripheral contact with the kiln during the rotation thereof, and
   4. a ball-and-socket swivel joint mounting the beam on the support base intermediate the beam ends, the joint having
      a. a center in the plane of symmetry of the rollers perpendicular to the axes of the rollers and equidistant from the roller axes, and
      b. a diameter smaller than the width of the rollers.

2. The support of claim 1, wherein the swivel joint comprises two concentric rings, one of the rings being fixed to the support base and the other ring being fixed to the beam.

3. The support of claim 2, further comprising an axle carrying the interior one of the concentric rings, the axle being parallel to the axes of the rollers.

4. The support of claim 2, further comprising an axle carrying the interior one of the concentric rings, the axle being perpendicular to the axes of the rollers and substantially parallel to the plane defined by the pair of rollers.

5. The support of claim 2, wherein the beam has two side edges, and further comprising an intermediate support fixed to the support base, disposed between the side edges of the beam and carrying the outer one of the rings, two flanges integral with the beam and encasing the joint, and an axle carrying the interior one of the rings, the flanges preventing any displacement of the beam parallel to the latter axles in respect of the support base.

6. The support of claim 1, wherein the beam is constituted by two cheek plates having bearings for the rollers and a casing interconnecting the two cheek plates, the swivel joint being disposed within the casing and the casing defining an opening to receive a support for the joint.

7. The support of claim 6, wherein the swivel joint comprises an interior ring and an outer ring concentric therewith, the interior ring having an axle fixed to the casing, and the outer ring being fixed to the support base.

8. The support of claim 6, wherein the swivel joint comprises an interior ring and an outer ring concentric therewith, the interior ring having an axle parallel to the axes of the rollers, the axle having ends journaled into bearings in the sides of the casing and the cheek plates, and the outer ring being fixed to the support base.

9. The support of claim 8, wherein the bearings comprise aligned bores of the same diameter in the sides of the casing and in the cheek plates in alignment with the axle, and bearing sleeves in the aligned bores whose interior diameters exceed the diameter of the axle.

10. The support of claim 1, further comprising a fixed anchorage, a pull rod of adjustable length linking the beam to the anchorage.

11. The support of claim 10, wherein the center of the linking joint between the pull rod and the beam is disposed on a straight line passing through the center of the swivel joint, parallel to a plane defined by the axes of the rollers and perpendicular the roller axes.

12. The support of claim 10, wherein the pull rod is parallel to the axes of the rollers in its median operating position.

13. The support of claim 1, wherein the rollers are axially displaceably mounted on the beam ends, and further comprising flanges on the rollers whereby they may be axially displaced by a hoop around the tubular rotary kiln engaged by the rollers during rotation.

14. The support of claim 13, wherein each of the rollers comprises two of the flanges bearing against a respective side edge of the hoop.

15. The support of claim 13, wherein each of the rollers comprises a single flange pressed against one of the sides of the hoop by a force permitting the rollers to recoil when they are pressed by the hoop, this flange being placed at the side of the roller against which the kiln is displaced when it expands.

16. The support of claim 15, further comprising a stop for limiting the roller recoil so that the total axial path of the roller is less than the maximal displacement of the hoop.

* * * * *